(12) United States Patent
Endo (10) Patent No.: US 12,420,805 B2
(45) Date of Patent: Sep. 23, 2025

(54) DRIVER ESTIMATION DEVICE, DRIVER ESTIMATION METHOD, AND PROGRAM

(71) Applicant: TOYOTA JIDOSHA KABUSHIKI KAISHA, Aichi-ken (JP)

(72) Inventor: Masato Endo, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 232 days.

(21) Appl. No.: 18/186,197

(22) Filed: Mar. 20, 2023

(65) Prior Publication Data

US 2023/0347904 A1    Nov. 2, 2023

(30) Foreign Application Priority Data

May 2, 2022    (JP) .................................. 2022-076203

(51) Int. Cl.
*B60W 40/08* (2012.01)
*B60R 16/037* (2006.01)
*G06N 3/00* (2023.01)

(52) U.S. Cl.
CPC ........... *B60W 40/08* (2013.01); *B60R 16/037* (2013.01); *B60W 2540/043* (2020.02)

(58) Field of Classification Search
CPC ........... B60W 40/08; B60W 2540/043; B60W 40/09; B60R 16/037
See application file for complete search history.

(56) References Cited

U.S. PATENT DOCUMENTS

| | | | |
|---|---|---|---|
| 10,425,622 B2 * | 9/2019 | Brudnak | .................... G06T 3/04 |
| 2018/0053102 A1 * | 2/2018 | Martinson | .......... G08G 1/09623 |
| 2018/0362049 A1 * | 12/2018 | Avireddi | ............. B60W 50/082 |
| 2020/0207341 A1 * | 7/2020 | Inoue | .............. B60W 30/18145 |
| 2021/0403304 A1 * | 12/2021 | Hayakawa | ............ B67C 7/0073 |

FOREIGN PATENT DOCUMENTS

JP        2018-52430 A    4/2018

* cited by examiner

*Primary Examiner* — Peter D Nolan
*Assistant Examiner* — Demetra R Smith-Stewart
(74) *Attorney, Agent, or Firm* — HAUPTMAN HAM, LLP (57) ABSTRACT

A driver estimation device includes a data acquisition unit. The data acquisition unit acquires operation data related to an operation performed by a driver before driving a vehicle for a plurality of preset operation items. The driver estimation device also includes a driver estimation unit. The driver estimation unit estimates the driver based on the operation data acquired by the data acquisition unit.

10 Claims, 6 Drawing Sheets

| DATA TYPE | OPERATION ITEM | OPERATION DATA |
|---|---|---|
| OPERATION PROCEDURE | DOOR LOCK OPERATION | 1 |
| | PARKING BRAKE OPERATION | 3 |
| | SHIFT LEVER OPERATION | 2 |
| OPERATION TIME | IGNITION SWITCH OPERATION | 11 SECONDS |
| | START OPERATION | |
| SETTING | SEAT HEIGHT POSITION SETTING OPERATION | ... |
| | SEAT FRONT-REAR POSITION SETTING OPERATION | ... |
| | SEATBELT OPERATION | ... |
| | AIR CONDITIONING SETTING OPERATION | ... |
| | CAR NAVIGATION SETTING OPERATION | ... |
| | AUDIO SETTING OPERATION | ... |

FIG. 7

DRIVER ESTIMATION DEVICE, DRIVER ESTIMATION METHOD, AND PROGRAM

CROSS-REFERENCE TO RELATED APPLICATION

This application claims priority to Japanese Patent Application No. 2022-076203 filed on May 2, 2022, incorporated herein by reference in its entirety.

BACKGROUND

1. Technical Field

The present disclosure relates to a driver estimation device, a driver estimation method, and a program.

2. Description of Related Art

Japanese Unexamined Patent Application Publication No. 2018-052430 (JP 2018-052430 A) discloses an individual identification service device that identifies an operator based on biometric information read from an operating finger of the operator when a vehicle switch is operated, and provides an individual identification service of the operator.

SUMMARY

However, in the technique described in JP 2018-052430 A, a driver cannot be identified until the operation is performed on a specific operation unit provided with biometric information acquisition means, so that the driver cannot be identified in a short period of time with high accuracy.

On the other hand, it has been found that a driver who drives a vehicle on a daily basis has routine operations performed before driving the vehicle, and there is a regularity with which an individual can be identified.

In consideration of the above facts, the present disclosure focuses on operations performed by a driver before driving a vehicle, and provides a driver estimation device, a driver estimation method, a program, and a generation method of a learned model that are capable of estimating a driver in a short period of time with high accuracy.

A driver estimation device according to claim 1 includes: a data acquisition unit that acquires operation data related to an operation performed by a driver before driving a vehicle for a plurality of preset operation items; and a driver estimation unit that estimates the driver based on the operation data acquired by the data acquisition unit.

The driver estimation device according to claim 1 estimates the driver based on the operation data related to the operation performed by the driver before driving the vehicle for a plurality of preset operation items. Therefore, the driver can be estimated in a short period of time with high accuracy.

In the driver estimation device according to claim 2, in claim 1, the data acquisition unit acquires the operation data including at least one of a procedure in which an operation related to the plurality of operation items is performed, an operation time, and a setting.

In the driver estimation device according to claim 2, the driver can be estimated based on at least one of the operation data of the procedure in which the operation related to the plurality of operation items is performed, the operation time, and the settings.

The driver estimation device according to claim 3 further includes, in claim 1, an operation proposal unit that proposes an operation that is likely to be executed by the driver, based on the operation data acquired by the data acquisition unit and an estimation result of the driver estimation unit. The driver estimation unit estimates the driver again when the driver does not execute the operation proposed by the operation proposal unit.

In the driver estimation device according to claim 3, an operation that is likely to be executed by the driver is proposed based on the operation data and the estimation result of the driver, and when the driver does not execute the proposed operation, the driver is estimated again. As a result, when there is a high possibility that the estimation result of the driver is erroneous, the driver is estimated again, making it possible to improve the accuracy of the estimation result. On the other hand, when the estimation result is correct, it is possible to make a proposal that will make the driver feel comfortable with regard to operations before driving.

In the driver estimation device according to claim 4, in any one of claims 1 to 3, the driver estimation unit inputs the operation data acquired by the data acquisition unit to a learned model that has undergone machine learning for estimating the driver of the vehicle, and executes arithmetic processing of the learned model to estimate the driver.

In the driver estimation device according to claim 4, by estimating the driver using the learned model that has undergone machine learning for estimating the driver, the driver can be estimated in a short period of time with high accuracy without requiring complicated calculations.

A driver estimation method according to claim 5 includes: acquiring operation data related to an operation performed by a driver before driving a vehicle for a plurality of preset operation items; and estimating the driver based on the acquired operation data.

In the driver estimation method according to claim 5, as described above, attention is paid to the operation performed by the driver before driving the vehicle, and the driver can be estimated in a short period of time with high accuracy.

A program according to claim 6 causes a computer to execute processes including: acquiring operation data related to an operation performed by a driver before driving a vehicle for a plurality of preset operation items; and estimating the driver based on the acquired operation data.

In the program according to claim 6, as described above, attention is paid to the operation performed by the driver before driving the vehicle, and the computer can be caused to execute processes including estimating the driver in a short period of time with high accuracy.

A generation method of a learned model according to claim 7 causes a computer to execute processes including: acquiring operation data related to an operation performed by a driver before driving a vehicle for a plurality of preset operation items, and acquiring an estimation result of estimating the driver based on the operation data; transmitting confirmation information that allows confirmation on whether the estimation result is correct to a communication terminal of the estimated driver after driving of the vehicle; acquiring teacher data in which the acquired operation data is associated with personal information of the driver when a response of the driver to the transmitted confirmation information indicates that the estimation result is correct; and generating the learned model for estimating the driver when the operation data related to the operation items is input based on the acquired teacher data.

In the generation method of the learned model according to claim 7, the confirmation information that allows confirmation on whether the estimation result is correct is transmitted to the communication terminal of the driver after driving of the vehicle. When a response of the driver to the transmitted confirmation information indicates that the estimation result is correct, the teacher data in which the acquired operation data is associated with the personal information of the driver is acquired. When the operation data related to the operation items is input based on the acquired teacher data, the learned model for estimating the driver is generated. Accordingly, it is possible to efficiently collect the learning data for the learned model for improving the estimation accuracy of the driver. As a result, attention is paid to the operation performed by the driver before driving the vehicle, and the driver can be estimated in a short period of time with high accuracy.

As described above, according to the driver estimation device, the driver estimation method, the program, and the generation method of the learned model according to the present disclosure, attention is paid to the operation performed by the driver before driving the vehicle, and the excellent effect of being able to estimate the driver in a short period of time with high accuracy can be exhibited.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A system S including a driver estimation device 10 according to an embodiment will be described with reference to the drawings.

Figure 1:
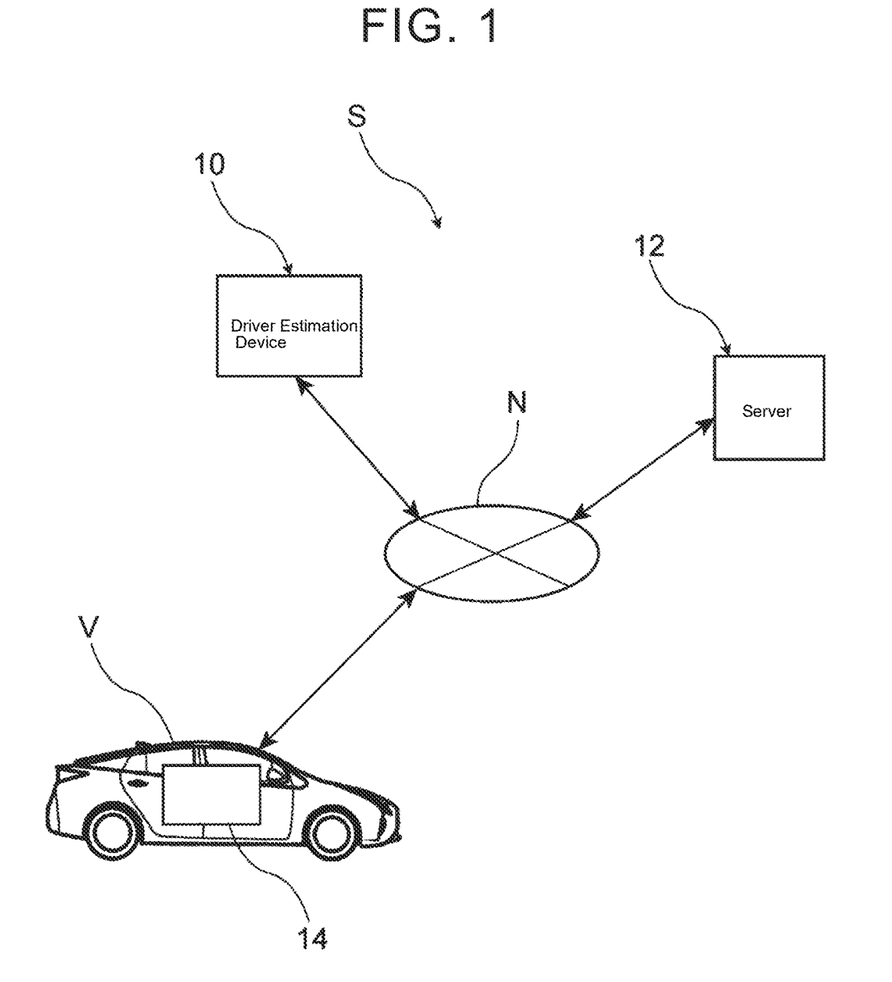
FIG. 1 is a schematic view showing an overall configuration of a driver estimation system according to an embodiment.

As shown in FIG. 1, the system S of the present embodiment includes the driver estimation device 10, a server 12, and a vehicle V. The driver estimation device 10, the server 12, and the vehicle V are connected by a network N. Although a plurality of vehicles V is connected to the network N, only one vehicle V is shown in FIG. 1 for convenience of explanation.

As an example, the driver estimation device 10 of the present embodiment is a control device provided outside the vehicle V. The vehicle V is equipped with an on-vehicle device 14.

The server 12 is a server owned by a manager of the vehicles V. That is, the manager who manages the vehicles V owns the server 12, and as an example in the present embodiment, the vehicle V is a vehicle used as a taxi that carries a user. The server 12 is owned by a taxi company.

Here, the driver estimation device 10 of the present embodiment estimates the driver based on operation data that the driver of each vehicle V performs before driving each vehicle V.

Hardware Configuration of Driver Estimation Device 10

Figure 2:
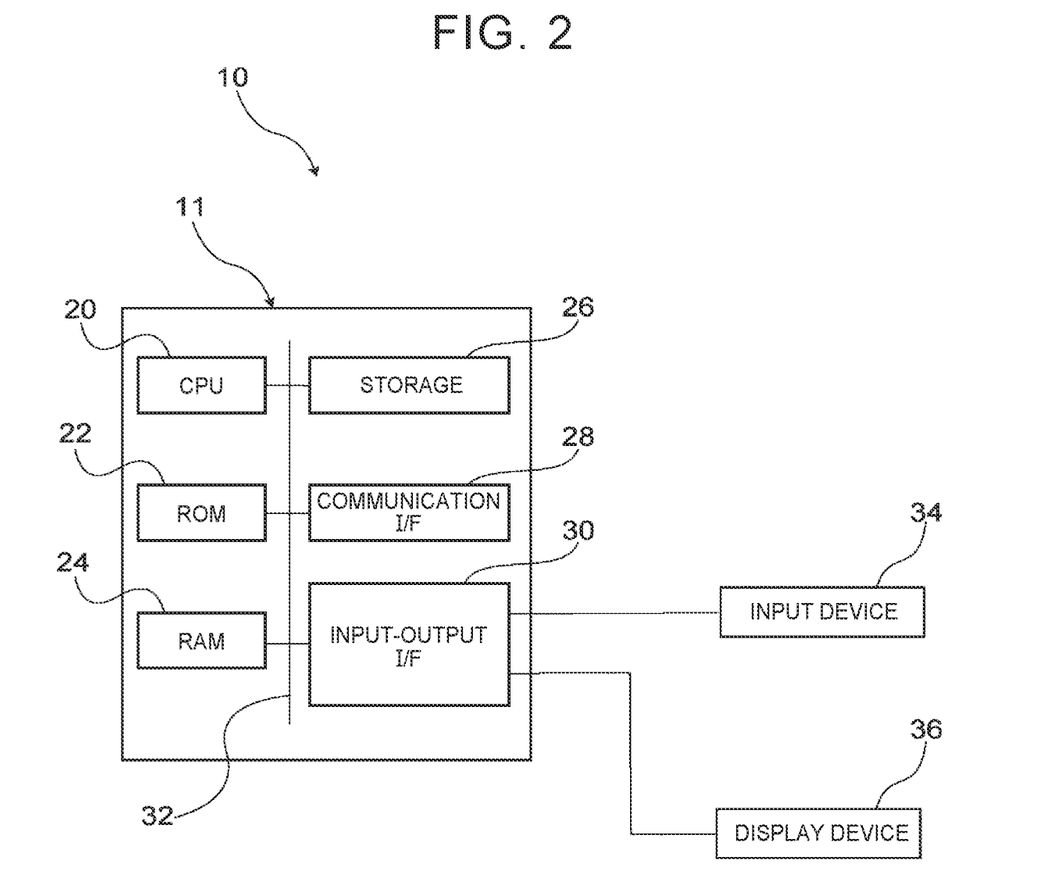
FIG. 2 is a block diagram showing a hardware configuration of a driver estimation device according to the embodiment.

FIG. 2 is a block diagram showing a hardware configuration of the driver estimation device 10. As shown in FIG. 2, the driver estimation device 10 is configured to include a central processing unit (CPU: processor) 20, a read-only memory (ROM) 22, a random access memory (RAM) 24, a storage 26, a communication interface (communication I/F) 28, and an input-output interface (input-output I/F) 30. Each configuration is communicably connected to each other via a bus 32.

The CPU 20 is a central processing unit that executes various programs and that controls various units. That is, the CPU 20 reads a program from the ROM 22 or the storage 26 and executes the program using the RAM 24 as a work area. The CPU 20 controls each of the above configurations and performs various arithmetic processes in accordance with the program recorded in the ROM 22 or the storage 26.

The ROM 22 stores various programs and various data. The RAM 24 temporarily stores a program or data as a work area. The storage 26 is composed of a hard disk drive (HDD) or a solid state drive (SSD), stores various programs including an operating system, and stores various data. In the present embodiment, the ROM 22 or the storage 26 stores a program for performing a driver estimation process, various data, and the like.

The communication I/F 28 is an interface used for the driver estimation device 10 to communicate with the server 12 and other devices, and for example, standards such as a controller area network (CAN), Ethernet (registered trademark), long term evolution (LTE), fiber distributed data interface (FDDI), and Wi-Fi (registered trademark) are used.

The input-output I/F 30 is electrically connected to an input device 34 and a display device 36. The input device 34 is a device for inputting a predetermined instruction to the driver estimation device 10, and includes, for example, a mouse and a keyboard. The display device 36 is a device such as a display for displaying information output from the driver estimation device 10.

Hardware Configuration of On-Vehicle Device 14

Figure 3:
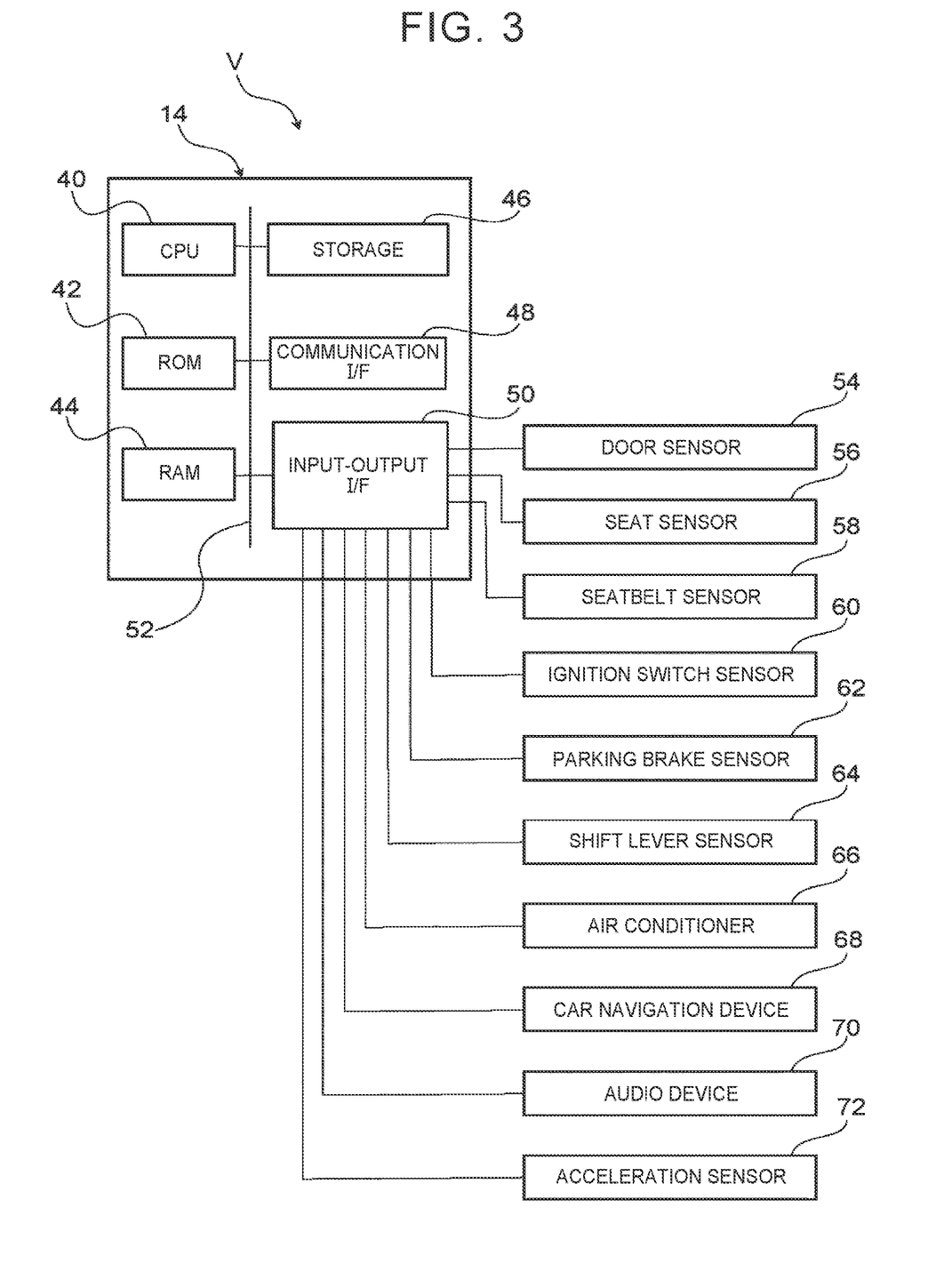
FIG. 3 is a block diagram showing a hardware configuration of an on-vehicle device according to the embodiment.

FIG. 3 is a block diagram showing the hardware configuration of the on-vehicle device 14. As shown in FIG. 3, the on-vehicle device 14 is configured to include a CPU (processor) 40, a ROM 42, a RAM 44, a storage 46, a communication I/F 48, and an input-output I/F 50. Each configuration is communicably connected to each other via a bus 52.

The CPU 40 is a central processing unit, and executes various programs and controls various units. That is, the CPU 40 reads a program from the ROM 42 or the storage 46 and executes the program using the RAM 44 as a work area. The CPU 40 controls each of the above configurations and executes various arithmetic processes in accordance with the program recorded in the ROM 42 or the storage 46.

The ROM 42 stores various programs and various data. The RAM 44 temporarily stores programs or data as a work area. The storage 46 is composed of a hard disk drive (HDD) or a solid state drive (SSD), stores various programs including an operating system, and stores various data. In the present embodiment, the ROM 42 or the storage 46 stores a program for performing various processes, various data, and the like.

The communication I/F 48 is an interface used for the on-vehicle device 14 to communicate with the server 12 and other devices, and standards such as CAN, Ethernet (registered trademark), LTE, FDDI, and Wi-Fi (registered trademark) are used.

The input-output I/F 50 is electrically connected to a door sensor 54, a seat sensor 56, a seatbelt sensor 58, an ignition switch sensor 60, a parking brake sensor 62, a shift lever sensor 64, an air conditioner 66, a car navigation device 68, an audio device 70, and an acceleration sensor 72.

The door sensor 54 detects various types of operation information performed by the driver on the door of the driver's seat of the vehicle V. Information acquired from the door sensor 54 is used, for example, to detect the timing at which the door of the driver's seat is locked.

The seat sensor 56 detects the settings of the driver's seat of the vehicle V. Information acquired from the seat sensor 56 is used, for example, to detect the seat position of the driver's seat, the rearward inclination angle of the seat back, and the like.

The seatbelt sensor 58 detects the settings of the seatbelt device of the driver's seat. Information acquired from the seatbelt sensor 58 is used, for example, to detect the withdrawal amount of the seatbelt.

The ignition switch sensor 60 detects the ON/OFF state of the ignition switch of the vehicle V. Information acquired from the ignition switch sensor 60 is used, for example, to detect the timing at which the engine of the vehicle V is started by the driver.

The parking brake sensor 62 detects the released state of the parking brake of the vehicle V. Information acquired from the parking brake sensor 62 is used, for example, to detect the timing at which the parking brake is released by the driver.

The shift lever sensor 64 detects the position of the shift lever of the vehicle V. Information acquired from the shift lever sensor 64 is used, for example, to detect the timing at which the shift lever is set to the "D (drive)" position.

The air conditioner 66 is a device that introduces conditioned air into the vehicle cabin, and is provided, for example, in the instrument panel and disposed facing the driver. Information acquired from the air conditioner 66 is used, for example, to detect the ON/OFF state of the air conditioner and the setting value of the air conditioning temperature.

The car navigation device 68 displays map information around the vehicle and a travel route to a set destination based on position information of the vehicle. Information acquired from the car navigation device 68 is used, for example, to detect whether a destination has been set and information about the set destination.

The audio device 70 is a device for controlling receiving, playing, and stopping of acoustic data, and is provided, for example, on an instrument panel and disposed facing the driver. Information acquired from the audio device 70 is used to detect whether the acoustic data is played, the volume, and the type of acoustic data that is played.

The acceleration sensor 72 detects an acceleration of the vehicle V. Acceleration data detected by the acceleration sensor 72 is used, for example, to detect the timing at which the vehicle V is started. Instead of the acceleration sensor 72, an accelerator operation amount or the like may be detected directly from an accelerator position sensor to detect the timing at which the vehicle V is started.

Functional Configuration of Driver Estimation Device 10

The driver estimation device 10 realizes various functions by using the above hardware resources. A functional configuration realized by the driver estimation device 10 will be described with reference to FIG. 4.

Figure 4:
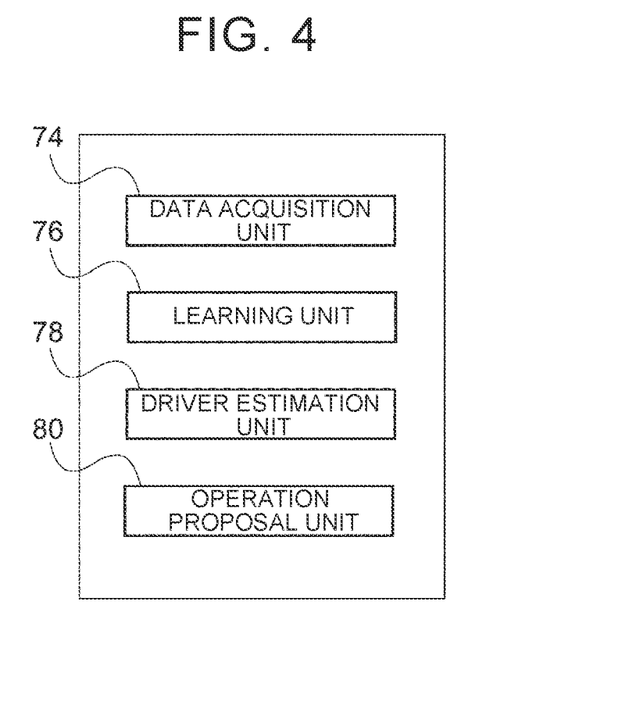
FIG. 4 is a block diagram showing a functional configuration of the driver estimation device according to the embodiment.

As shown in FIG. 4, the driver estimation device 10 includes a data acquisition unit 74, a learning unit 76, a driver estimation unit 78, and an operation proposal unit 80 as functional configurations. Each functional configuration is realized as the CPU 20 reads and executes the program stored in the ROM 22 or the storage 26.

The data acquisition unit 74 acquires operation data related to an operation performed by the driver before driving the vehicle V for a plurality of preset operation items. Note that "before driving the vehicle V" is, for example, a period from when the ignition switch of the vehicle V is turned on until the vehicle is started. In one example of the present embodiment, the operation data of the vehicle V is transmitted from the vehicle V to the server 12 and the operation data is accumulated in the server 12. Therefore, the data acquisition unit 74 acquires the operation data from the server 12. The operation data acquired by the data acquisition unit 74 is, for example, information on the procedure in which the operation related to the plurality of operation items is performed, information on the operation time, and information on the settings.

Figure 6:
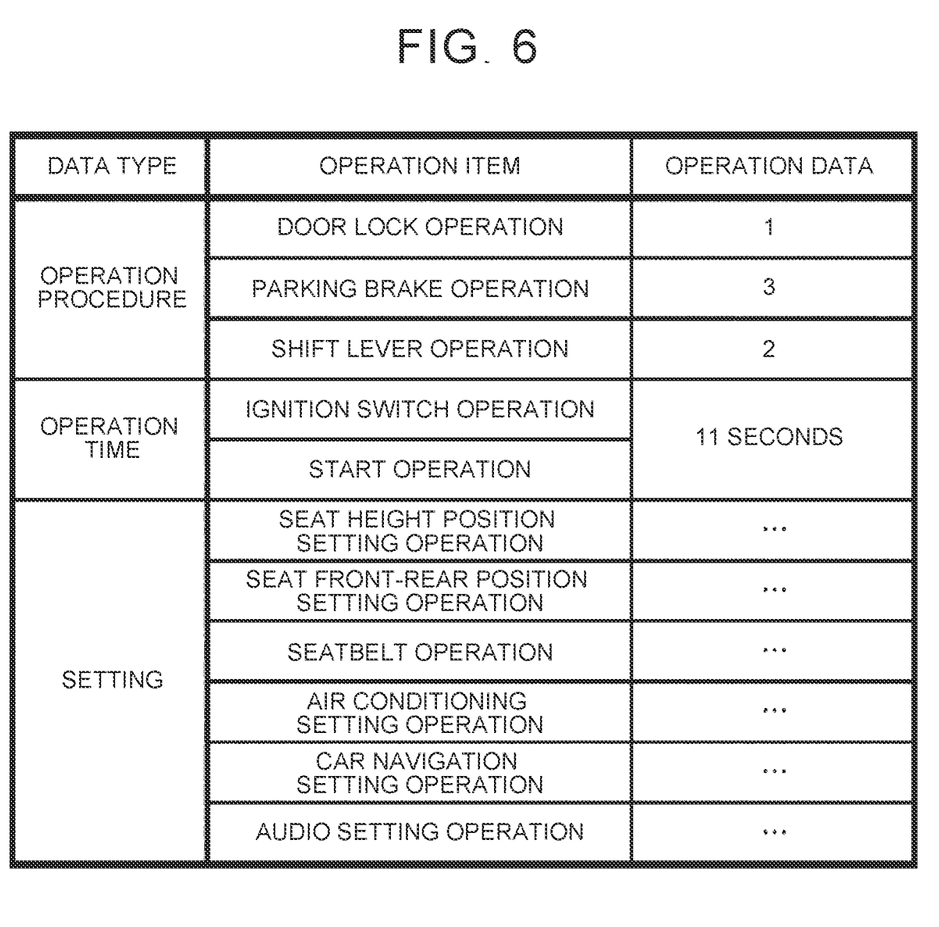
FIG. 6 is a table showing an example of operation items.

As shown in FIG. 6, in the present embodiment, as an example, the types of the operation data to be acquired are classified into operation procedure, operation time, and settings.

Operation items classified into the operation procedure include, for example, door lock operation, parking brake operation, and shift lever operation. As for the door lock operation, the timing at which the door of the driver's seat is locked is acquired. As for the parking brake operation, the timing at which the parking brake is released is acquired. As for the shift lever operation, the timing at which the shift lever is set to the "D (drive)" position is acquired.

In this classification of the operation procedure, the order in which operations are performed for the plurality of operation items (door lock operation, parking brake operation, and shift lever operation) is acquired as the operation data. For example, in the example shown in FIG. 6, data indicating that the door lock operation was performed, the shift lever operation was subsequently performed, and finally the parking brake operation was performed is acquired as the operation data.

Operation items classified into the operation time include, for example, ignition switch operation and start operation. As for the ignition switch operation, the timing at which the ignition switch is turned on is acquired. As for the start operation, the timing at which the acceleration sensor 72 detects the start of the vehicle is acquired. Further, in this classification of the operation time, the time elapsed from when the ignition switch is turned on to when the vehicle V is started is acquired as the operation data. This elapsed time is determined as the operation time required for the operation performed by the driver before driving the vehicle V. In the example shown in FIG. 6, data indicating that the operation time is 11 seconds is acquired as the operation data.

The plurality of operation items classified into the settings includes, for example, seat height position setting operation, seat front-rear position setting operation, seatbelt operation, air conditioning setting operation, car navigation setting operation, and audio setting operation. For the plurality of operation items classified into the settings, the setting of each operation item is acquired as the operation data.

For example, as for the seat height position setting operation, the amount of change in the seat height from the lowest seat position to the seat height position after the setting is acquired as the operation data. As for the seat front-rear position setting operation, the rearward movement amount from the front position where the front-rear position of the seat is positioned to the foremost side until reaching the seat position after the setting is acquired as the operation data. As for the seatbelt operation, the withdrawal amount of the seatbelt is acquired as the operation data. As for the air conditioning setting operation, for example, the set temperature for the air conditioning is acquired as the operation data. As for the car navigation setting operation, for example, the set destination is acquired as the operation data. As for the audio setting operation, for example, the type of acoustic data that is received or played is acquired as the operation data.

Figure 5:
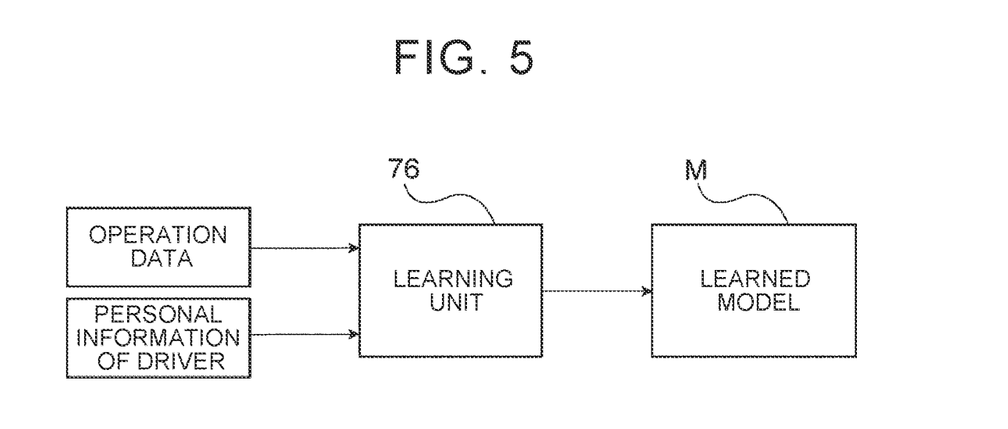
FIG. 5 is a block diagram illustrating a learning phase in the embodiment.

The learning unit 76 shown in FIG. 4 has a function of generating a learned model M by machine learning. Specifically, as shown in FIG. 5, the learning unit 76 acquires teacher data in which the operation data related to the plurality of operation items is associated with personal information of the driver, and generates a learned model M for estimating the driver when the operation data related to the operation items is input based on the acquired teacher data.

In the present embodiment, as will be described later, when the estimation result of the driver by the function of the driver estimation unit 78 is correct, data in which the operation data related to the plurality of operation items is associated with the personal information of the driver is acquired from the server 12 as the teacher data, and the learned model M is updated.

As for the learned model M, for example, a deep neural network is applied. Long short term memory (LSTM), which is a kind of recursive neural network (RNN), is applied to the learned model M of the present embodiment, for example. Also, for generating the learned model M, for example, an error backpropagation method is used. The learned model M is generated by machine learning a deep neural network model so that driving characteristics and cognitive characteristics are output when the operation data is input.

The driver estimation unit 78 estimates the driver of the vehicle V based on the operation data acquired by the data acquisition unit 74. Specifically, the driver estimation unit 78 inputs the operation data acquired by the data acquisition unit 74 to the learned model M generated by the learning unit 76, and executes arithmetic processing of the learned model M to estimate the driver.

Further, the driver estimation unit 78 estimates the driver again when an occupant does not execute a proposal from the operation proposal unit 80, which will be described later. Specifically, by acquiring the operation data indicating that the proposed operation was not executed or the operation data executed by the driver instead of the proposed operation, and executing the arithmetic processing of the learned model M again, the driver is estimated.

Based on the operation data acquired by the data acquisition unit 74 and the estimation result of the driver estimation unit 78, the operation proposal unit 80 proposes an operation that is likely to executed by the driver of the vehicle V. Specifically, the operation proposal unit 80 statistically and probabilistically predicts an operation that is likely to be executed based on past operation data of the vehicle V that is associated and accumulated for each driver, and proposes to the driver about the predicted operation. The proposed operation is not limited to an operation performed before driving, and may be an operation performed during driving.

It should be noted that the prediction of the operation that is likely to be executed by the driver of vehicle V may be made by acquiring teacher data in which the operation data serving as information on the plurality of operation items is associated with the personal information of the driver, and generating a learned model for estimating an operation that is likely to be executed by the driver when the operation data related to the operation items is input based on the teacher data.

That is, the configuration may be such that the operation proposal unit 80 inputs the operation data acquired by the data acquisition unit 74 and the personal information of the driver that has been estimated by the driver estimation unit 78 to the learned model that has undergone machine learning for estimating the operation that is likely to be executed by the driver, and executes the arithmetic processing of the learned model, so that the operation that is likely to be executed by the driver is estimated.

The operation can be proposed to the driver by a method of displaying image data on a display in the vehicle or a method of outputting voice data via a speaker. For example, when a "seat front-rear position setting operation" is predicted as an operation that is likely to be executed by the driver, the speaker inside the vehicle outputs voice data proposing the "seat front-rear position setting operation" to the estimated driver such as "Would you like the front-rear position of the seat to be set to the position previously set for Mr./Ms. ABC?". In response to this, when a response indicating consent to the proposal from the operation proposal unit 80 is acquired by the voice uttered by the driver or the operation on the operation unit, the proposed operation is executed, enabling assistance of the operation of the occupant.

On the other hand, when receiving a response from the occupant indicating that he/she does not agree with the proposal, the operation proposal unit 80 determines that the estimation result of the driver may be erroneous because the proposed operation was not executed. By acquiring the operation data indicating that the proposed operation was not executed or the operation data executed by the driver instead of the proposed operation, and inputting the operation data in the learned model M, the driver estimation unit 78 estimates the driver again.

Effect

Next, the effect of the present embodiment will be described.

Driver Estimation Process

Figure 7:
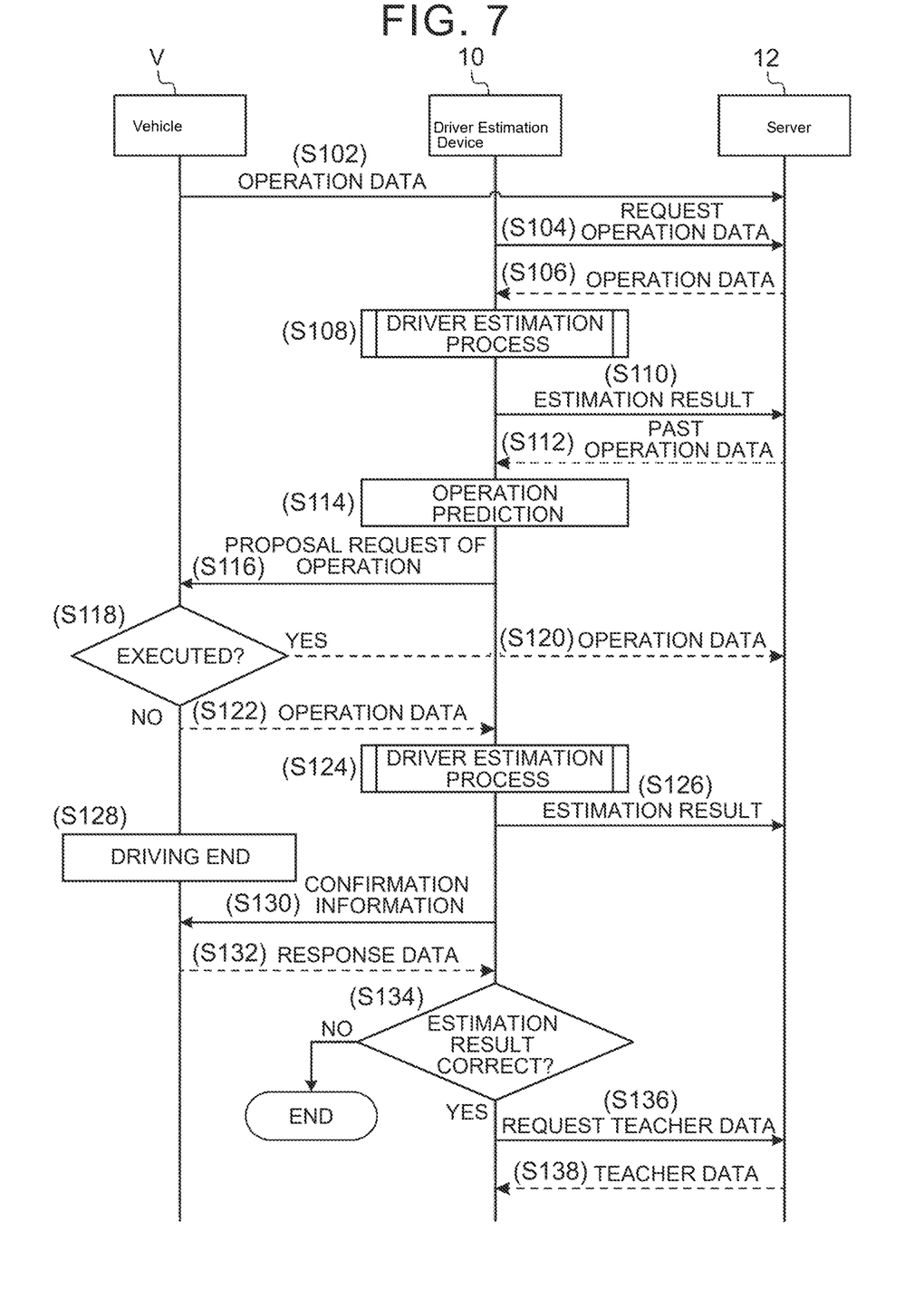
FIG. 7 is a sequence diagram showing an example of the flow of a driver estimation process in the embodiment.

An example of the flow of the driver estimation process will be described using the sequence diagram shown in FIG. 7. Note that the processing in the driver estimation device 10 is realized as the CPU 20 functions as the data acquisition unit 74 and the driver estimation unit 78.

In step S102, the operation data is transmitted from the vehicle V to the server 12. Specifically, signals detected by the door sensor 54, the seat sensor 56, the seatbelt sensor 58, the ignition switch sensor 60, the parking brake sensor 62, the shift lever sensor 64, the air conditioner 66, the car navigation device 68, the audio device 70, and the acceleration sensor 72 that are mounted on the vehicle V are transmitted to the server 12 as the operation data. At this time, data processed in advance on the vehicle V side may be transmitted to the server 12 as the operation data.

The server 12 accumulates the operation data received from the vehicle V for each vehicle V or for each driver.

In step S104, the driver estimation device 10 requests the operation data to the server 12 using the function of the data acquisition unit 74. In step S106, the operation data is transmitted from the server 12 to the driver estimation device 10.

In step S108, the driver estimation device 10 performs the driver estimation process. Specifically, with the function of the driver estimation unit 78, the driver estimation device 10 inputs the operation data acquired by the data acquisition unit 74 to the learned model M, and executes arithmetic processing of the learned model M to estimate the driver.

In step S110, the driver (estimation result) estimated in the driver estimation process is transmitted to the server 12.

In step S112, the accumulated past operation data of the estimated driver is transmitted from the server 12 to the driver estimation device 10.

In step S114, the driver estimation device 10 predicts an operation that is likely to be executed by the estimated driver, and proposes execution of the predicted operation. Specifically, with the function of the operation proposal unit 80, the driver estimation device 10 predicts the operation that is likely to be executed by the driver subsequent to the operation data acquired by the data acquisition unit 74 based on statistical probability prediction obtained from past operation data acquired from the server 12.

In step S116, the predicted operation is proposed to the driver of the vehicle V. Specifically, the driver estimation device 10 transmits a proposal request to the vehicle V, and outputs image data, voice data, or the like for proposing the operation in the vehicle V to the driver.

In step S118, it is determined whether the operation proposed by the driver estimation device 10 has been executed in the vehicle V. When it is determined that the proposed operation has been executed in the vehicle V, the operation data is transmitted from the vehicle V to the server 12 in step S120. On the other hand, when it is determined that the proposed operation has not been executed in the vehicle V, the operation data is transmitted from the vehicle V to the driver estimation device 10 in step S122. Note that this determination process may be performed by transmitting the operation data for the proposal from the driver estimation device 10 from the vehicle V to the driver estimation device 10 and executing the determination process in the driver estimation device 10. Alternatively, the operation data for the proposal from the driver estimation device 10 may be transmitted to the server 12 so that the server 12 executes the determination process, and the result may be transmitted to the driver estimation device 10.

In step S124, the driver estimation device 10 estimates the driver again based on the function of the driver estimation unit 78. Specifically, by acquiring the operation data indicating that the proposed operation was not executed or the operation data executed by the driver instead of the proposed operation, and inputting the operation data in the learned model M, the driver estimation unit 78 estimates the driver again.

In step S126, the driver estimated by the driver estimation process is transmitted to the server 12.

When the driving of the vehicle V ends in step S128, in step S130, the driver estimation device 10 transmits confirmation information allowing confirmation on whether the estimation result is correct to a communication terminal of the estimated driver. In one example of the present embodiment, the communication terminal of the driver is the on-vehicle device 14. Note that the communication terminal may be a communication terminal such as a smartphone or a tablet carried by the estimated driver.

In step S132, response data from the driver for the confirmation information is transmitted from the vehicle V serving as the communication terminal to the driver estimation device 10.

In step S134, the driver estimation device 10 determines whether the estimation result of the driver estimation process is correct based on the response data. When the estimation result is determined to be incorrect, the process is terminated. On the other hand, when the estimation result is determined to be correct, in step S136, the teacher data is requested to the server 12.

In step S138, the teacher data in which the acquired operation data is associated with the personal information of the driver is transmitted from the server 12 to the driver estimation device 10. As a result, the driver estimation device 10 can update the learned model M with the function of the learning unit 76.

As described above, the driver estimation device 10 according to the present embodiment estimates the driver based on the operation data related to the operation performed by the driver before driving the vehicle for a plurality of preset operation items. Therefore, the driver can be estimated in a short period of time with high accuracy.

Also, in this case, the driver can be estimated based on at least one of the operation data of the procedure in which the operation related to the plurality of operation items is performed, the operation time, and the settings.

Further, in the driver estimation process, an operation that is likely to be executed by the driver is proposed based on the operation data and the estimation result of the driver, and when the driver does not execute the proposed operation, the driver is estimated again. As a result, when there is a high possibility that the estimation result of the driver is erroneous, the driver is estimated again, making it possible to improve the accuracy of the estimation result. On the other hand, when the estimation result is correct, it is possible to make a proposal that will make the driver feel comfortable with regard to operations before driving.

Furthermore, in the present embodiment, by estimating the driver using the learned model M that has undergone machine learning for estimating the driver, the driver can be estimated in a short period of time with high accuracy without requiring complicated calculations. In this learned model M, the confirmation information allowing confirmation on whether the estimation result is correct is transmitted to the communication terminal of the driver after driving the vehicle, and when the response of the driver for the transmitted confirmation information indicates that the estimation result is correct, the teacher data in which the acquired operation data is associated with the personal information of the driver is acquired. The learned model M for estimating the driver is generated (updated) when the operation data related to the operation items is input based on the acquired teacher data. As a result, it is possible to efficiently collect the learning data for the learned model for improving the estimation accuracy of the driver.

Supplementary Explanation

The driver estimation device 10 according to the present embodiment has been described above. However, it is understood that the driver estimation device 10 can be implemented in various modes without departing from the scope of the present disclosure. For example, in the above embodiment, the driver estimation device 10 is provided outside the vehicle V, but the present disclosure is not limited to this, and the vehicle V may be equipped with the driver estimation device 10. In this case, the driver estimation device 10 may acquire the operation data directly from the vehicle V without transmitting the operation data of the vehicle V to the server 12.

The driver estimation process performed by the driver estimation unit 78 may be executed inside the driver estimation device 10, or may be executed on the server 12 side by transmitting necessary data to the server 12. When the driver estimation process is executed on the server 12 side, the learned model M may be stored in the server 12.

Furthermore, in the above embodiment, the driver estimation unit 78 estimates the driver by inputting the operation data and the like to the learned model M and executing arithmetic processing of the learned model M. However, the present disclosure is not limited to this. For example, the driver may be estimated without using the learned model M. In this case, a method may be used in which a table in which the operation data is associated with the personal information of the driver is stored in advance, and the driver is estimated by referring to this table.

Further, in the above embodiment, the door lock operation, the parking brake operation, the shift lever operation, the ignition switch operation, the start operation, the seat height position setting operation, the seat front-rear position setting operation, the seatbelt operation, the air conditioning setting operation, the car navigation setting operation, and the audio setting operation are listed as the operation items of the operation data. However, the present disclosure is not limited to this. For example, part of the above data may be used as the operation data. In addition to the above data, data including a window opening/closing operation, a buckle switch locking operation, a side mirror operation, a rear view mirror operation, and the like may be used as the operation data.

Furthermore, various processors other than the CPU 20 may execute the process in which the CPU 20 reads and executes the program in the above embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor. In addition, the above processes may be executed by one of these various processors, or may be executed by a combination of two or more processors of the same kind or different kinds. For example, the processes may be executed by a plurality of FPGAs, a combination of the CPU and the FPGA, and the like. Furthermore, the hardware structure of each of the various processors is, more specifically, an electric circuit in which circuit elements such as semiconductor elements are combined.

Furthermore, in the above embodiment, the storage 26 and the storage 46 are configured to store various data. However, the present disclosure is not limited to this. For example, a non-temporary storage medium such as a compact disc (CD), a digital versatile disc (DVD), and a serial bus (USB) memory may be set as a storage unit. In this case, various programs, data, and the like are stored in the above storage media.

What is claimed is:

1. A driver estimation device comprising:
   a data acquisition unit that acquires:
     operation data related to an operation performed by a driver for a period of time following an ignition switch for a vehicle being turned ON until movement of the vehicle for a plurality of preset operation items, and
     an order in which the plurality of operation items is performed, wherein the plurality of operation items includes a door lock operation, a parking brake operation, and a shift lever operation;
   a driver estimation unit that estimates, using a trained neural network, an operation item of the plurality of operation items likely to be executed by the driver based on the operation data acquired by the data acquisition unit;
   a proposal unit for proposing an operation item of the plurality of operation items to the driver using an audio device or a display device;
   a sensor for detecting an operation item of the driver; and
   the driver estimation unit is further configured to re-train the trained neural network in response to the detected operation item matching the proposed operation item.

2. The driver estimation device according to claim 1, wherein the data acquisition unit acquires the operation data including at least one of a procedure in which an operation related to the plurality of operation items is performed, an operation time, and a setting.

3. The driver estimation device according to claim 1, wherein the driver estimation unit inputs the operation data acquired by the data acquisition unit to a learned model of the trained neural network that has undergone machine learning for estimating the driver of the vehicle, and executes arithmetic processing of the learned model to estimate the driver.

4. The driver estimation device according to claim 1, wherein the driver estimation unit is configured to repeat estimating the driver in response to detected operation item being different from the proposed operation item.

5. The driver estimation device according to claim 1, wherein the operation data includes a time elapse from when the ignition switch is turned ON to when movement of the vehicle begins.

6. The driver estimation device according to claim 1, wherein the operation data includes an amount of change from a lowest seat position to a seat height position set by the driver.

7. A driver estimation method comprising:
   acquiring operation data related to an operation performed by a driver for a period of time following an ignition switch for a vehicle being turned ON until movement of the vehicle for a plurality of preset operation items, and an order in which the plurality of operation items is performed, wherein the plurality of operation items includes a door lock operation, a parking brake operation, and a shift level operation;
   estimating, using a trained neural network, an operation item of the plurality of operation items likely to be executed by the driver based on the acquired operation data;
   proposing an operation item of the plurality of operation items to the driver using an audio device or a display device;
   detecting an operation item of the driver; and
   re-training the trained neural network in response to the detected operation item matching the proposed operation item.

8. The driver estimation method according to claim 7, further comprising repeating estimating the driver in response to detected operation item being different from the proposed operation item.

9. A non-transitory computer readable medium configured to store instructions that causes a computer to execute processes comprising:
- acquiring operation data related to an operation performed by a driver for a period of time following an ignition switch for a vehicle being turned ON until movement of the vehicle for a plurality of preset operation items, and an order in which the plurality of operation items is performed, wherein the plurality of operation items includes a door lock operation, a parking brake operation, and a shift level operation;
- estimating, using a trained neural network, an operation item of the plurality of operation items likely to be executed by the driver based on the acquired operation data;
- proposing an operation item of the plurality of operation items to the driver using an audio device or a display device;
- detecting an operation item of the driver; and
- re-training the trained neural network in response to the detected operation item matching the proposed operation item.

10. The non-transitory computer readable medium according to claim 9, wherein the processes further comprise estimating the driver in response to detected operation item being different from the proposed operation item.

* * * * *